United States Patent
Honkomp et al.

(10) Patent No.: US 12,515,600 B2
(45) Date of Patent: Jan. 6, 2026

(54) UTILITY VEHICLE TRAILER HAVING A VEHICLE ELECTRICAL DISTRIBUTION SYSTEM

(71) Applicants: Dieter Honkomp, Steinfeld (DE); Michael Rübig, Bühlertal (DE); John Küsters, Vreden (DE); Fabian Geiger, Muggensturm (DE)

(72) Inventors: Dieter Honkomp, Steinfeld (DE); Michael Rübig, Bühlertal (DE); John Küsters, Vreden (DE); Fabian Geiger, Muggensturm (DE)

(73) Assignee: Schmitz Cargobull AG, Altenberge (DE)

( * ) Notice: Subject to any disclaimer, the term of this patent is extended or adjusted under 35 U.S.C. 154(b) by 86 days.

(21) Appl. No.: 18/312,014

(22) Filed: May 4, 2023

(65) Prior Publication Data
US 2023/0382327 A1    Nov. 30, 2023

(30) Foreign Application Priority Data
May 5, 2022    (EP) .................................. 22171924

(51) Int. Cl.
*B60R 16/03*    (2006.01)
*B60L 1/00*    (2006.01)

(52) U.S. Cl.
CPC .............. *B60R 16/03* (2013.01); *B60L 1/003* (2013.01); *B60L 2200/28* (2013.01); *B60L 2210/10* (2013.01)

(58) Field of Classification Search
CPC ............. B60L 2200/28; B60L 2200/36; B60L 2200/40; B60L 2200/44;
(Continued)

(56) References Cited

U.S. PATENT DOCUMENTS

| 8,004,242 B1 * | 8/2011 | Purkey ................. B60R 16/033 320/132 |
| 8,295,950 B1 * | 10/2012 | Wordsworth ........ B60H 1/3232 700/297 |

(Continued)

FOREIGN PATENT DOCUMENTS

| DE | 102020118861 A1 | 1/2022 |
| DE | 102020122946 A1 | 3/2022 |

(Continued)

OTHER PUBLICATIONS

O. Rabiaa, B. H. Mouna, S. Lassaad, F. Aymen and A. Aicha, "Cascade Control Loop of DC-DC Boost Converter Using PI Controller,", Nov. 21, 2018, 2018 International Symposium on Advanced Electrical and Communication Technologies (ISAECT), Rabat, Morocco, 2018, pp. 1-5 (Year: 2018).*

*Primary Examiner* — Rexford N Barnie
*Assistant Examiner* — David A Shiao
(74) *Attorney, Agent, or Firm* — Reinhart Boerner Van Deuren P.C.

(57) ABSTRACT

A utility vehicle trailer having a vehicle electrical distribution system. The vehicle electrical distribution system includes a control unit having a first voltage transformer device. The electrical energy for operating at least one consumer connected to the control unit in a first operating state of the control unit is provided via an energy supply connection, via which the vehicle electrical distribution system is connected, at least in the first operating state, to an electrical energy source of an electronic braking system of the utility vehicle trailer. Electrical energy for operating the at least consumer in a second operating state of the control unit is provided by an electrical energy store of the utility vehicle trailer. The first voltage transformer device is configured to decouple a first ground potential connected to the
(Continued)

energy supply connection from a second ground potential connected to the electrical energy store of the utility vehicle trailer.

15 Claims, 3 Drawing Sheets

(58) Field of Classification Search
CPC .... B60R 16/03–033; H02J 2310/40–48; H02J 7/14–1492
See application file for complete search history.

(56) References Cited

U.S. PATENT DOCUMENTS

| | | | |
|---|---|---|---|
| 10,240,847 B1* | 3/2019 | Thomas, Jr. | F25D 11/003 |
| 2009/0033148 A1* | 2/2009 | Hoff | B60K 6/46 |
| | | | 307/10.1 |
| 2011/0114398 A1* | 5/2011 | Bianco | B60K 1/04 |
| | | | 320/109 |
| 2014/0265560 A1* | 9/2014 | Leehey | B60L 58/13 |
| | | | 307/10.1 |
| 2015/0060160 A1* | 3/2015 | Kerschl | B62D 53/00 |
| | | | 180/54.1 |
| 2015/0246593 A1* | 9/2015 | Larson | B60H 1/00428 |
| | | | 62/236 |
| 2018/0015808 A1* | 1/2018 | Kolda | F25B 1/10 |
| 2020/0086712 A1* | 3/2020 | Schumacher | H02J 1/14 |
| 2020/0086744 A1* | 3/2020 | Schumacher | B60L 58/22 |
| 2020/0233410 A1* | 7/2020 | Burns | B60L 50/66 |
| 2022/0152871 A1* | 5/2022 | Heilig | B60L 50/61 |
| 2023/0174008 A1* | 6/2023 | Lowe | F25D 29/003 |
| | | | 62/236 |
| 2023/0347841 A1* | 11/2023 | Hunley | B60W 10/26 |
| 2023/0365024 A1* | 11/2023 | Reid | B60L 8/003 |

FOREIGN PATENT DOCUMENTS

| | | |
|---|---|---|
| EP | 2607196 A2 | 6/2013 |
| EP | 3769984 A1 | 1/2021 |

* cited by examiner

UTILITY VEHICLE TRAILER HAVING A VEHICLE ELECTRICAL DISTRIBUTION SYSTEM

CROSS-REFERENCE TO RELATED PATENT APPLICATIONS

This patent application claims priority to European Patent Application No. 22171924.8, filed May 5, 2022, the entire teachings and disclosures of the aforementioned application is incorporated herein by reference thereto.

FIELD

The invention relates to a utility vehicle trailer having a vehicle electrical distribution system.

BACKGROUND

Modern utility vehicle trailers such as, for example, semitrailers often comprise electronic components and systems, such as, for example, telematics systems. For example, sensors of the utility vehicle trailer can detect data of the utility vehicle trailer and provide it to a user of the utility vehicle trailer via a telematics system. Data can in this case be pieces of information on components of the utility vehicle trailer, with the result that, for example, wear on such components can be identified early. It is also possible for a telematics system to be used to monitor a capacity utilization of the utility vehicle trailer during transportation of goods, with the result that the utility vehicle trailer can be used in optimum fashion with respect to wear and fuel consumption.

Such electronic systems can be supplied electrical energy as consumers of a vehicle electrical distribution system of the utility vehicle trailer, for example, via an electrical energy source of a towing vehicle when the utility vehicle trailer is connected to the towing vehicle. In order to increase flexibility and in order to be able to reduce emissions, if appropriate, in addition an energy store of the utility vehicle trailer, for example an electric battery, can be added for energy supply purposes. However, it is necessary in particular for safety reasons that a ground potential which, in the state in which the towing vehicle is connected to the utility vehicle trailer, is connected to the electrical energy source of the towing vehicle, and therefore generally also to an electronic braking system of the utility vehicle trailer, is isolated from a ground potential of the electric battery.

SUMMARY OF SOME EXEMPLARY EMBODIMENTS OF THE INVENTION

One object of the present invention is, against this background, to configure and develop a utility vehicle trailer having a vehicle electrical distribution system in such a way that at least one consumer of the vehicle electrical distribution system can be supplied electrical energy from an electrical energy source of an electronic braking system of the utility vehicle trailer and electrical energy from an electrical energy store of the utility vehicle trailer.

In accordance with the invention, a utility vehicle trailer having a vehicle electrical distribution system is disclosed, wherein the vehicle electrical distribution system comprises a control unit having a first voltage transformer device, wherein electrical energy for operating at least one consumer connected to the control unit in a first operating state of the control unit is provided via an energy supply connection, via which the vehicle electrical distribution system is connected, at least in the first operating state, to an electrical energy source of an electronic braking system of the utility vehicle trailer, wherein electrical energy for operating the at least one consumer in a second operating state of the control unit is provided by an electrical energy store of the utility vehicle trailer, and wherein the first voltage transformer device is configured:
to decouple a first ground potential connected to the energy supply connection from a second ground potential connected to the electrical energy store of the utility vehicle trailer.

It goes without saying in this case that, in the second operating state of the control unit, energy for operating the at least one consumer can additionally also be provided via the energy supply connection, and that, in the first operating state of the control unit, energy for operating the at least one consumer can additionally also be provided by the electrical energy store of the utility vehicle trailer. In one exemplary embodiment, in the first operating state more than 50% of the electrical energy for operating the at least one consumer connected to the control unit is provided via the energy supply connection, via which the vehicle electrical distribution system is connected, at least in the first operating state, to the electrical energy source of the electronic braking system of the utility vehicle trailer. In one exemplary embodiment, in the second operating state more than 50% of the electrical energy for operating the at least one consumer is provided by the electrical energy store of the utility vehicle trailer.

Properties of the disclosed utility vehicle trailer having the vehicle electrical distribution system are described below, sometimes by way of example.

A utility vehicle trailer is, for example, a trailer for a towing vehicle, in one exemplary embodiment for a heavy goods vehicle, such as a semitrailer, in particular a semitrailer having a box body. Such utility vehicle trailers are in particular intended for the transportation of goods, preferably piece goods, on public roads. For this purpose, utility vehicle trailers have different types of utility vehicle bodies which are used for accommodating the goods to be transported in a cargo area. Thus, for example, box bodies having solid side walls, a solid end wall, a rear wall formed by folding doors and a solid roof which surround the cargo area are known. Since the box bodies are enclosed, box bodies are particularly suitable for the transportation of humidity-sensitive and/or temperature-sensitive goods, i.e., for example, for so-called dry freight and/or refrigerated freight. In addition to box bodies, in addition so-called tarpaulin bodies are known in which the side walls and the roof are closed off by at least one tarpaulin. The end wall in the case of tarpaulin bodies is usually in the form of a solid wall, whereas the rear wall is generally formed by two folding doors in order to load up the cargo area from the rear, as required. If a tarpaulin can be shifted along the side wall, this is also referred to as so-called curtainsiders. Correspondingly, a utility vehicle body should be understood to mean, for example, a box body, a tarpaulin body and/or a curtainsider. In exemplary embodiments, the utility vehicle trailer is a semitrailer.

The vehicle electrical distribution system can generally comprise electrical components which can be used for the supply of electrical energy to the at least one consumer and/or for a flow of information, for example from a telematics system as exemplary consumer. It goes without saying that the vehicle electrical distribution system can comprise, in addition to the components explicitly described here, yet further components such as, in particular, electrical lines.

The vehicle electrical distribution system comprises a control unit, which at least regulates the supply of electrical energy to the at least one consumer. The control unit is configured in exemplary embodiments in such a way that it enables the first operating state, in which the at least one consumer draws (at least most of the) electrical energy via the energy supply connection, and the second operating state, in which the at least one consumer draws (at least most of the) electrical energy from the electrical energy store.

For example, the control unit can be configured in such a way that, in a case in which the utility vehicle trailer is not coupled to a towing vehicle, and the vehicle electrical distribution system is then not connected to an alternator of the towing vehicle as exemplary energy source of the electronic braking system, a consumer connected to the control unit automatically draws electrical energy from the electrical energy store of the utility vehicle. The control unit can furthermore be configured in such a way that, in a case in which the vehicle electrical distribution system is electrically connected to the electrical energy source of the electronic braking system, a consumer connected to the control unit draws electrical energy from the electrical energy source of the electronic braking system via the energy supply connection, while at the same time the energy store of the utility vehicle trailer is charged via the energy supply connection. The control unit can, however, furthermore also be configured in such a way that a consumer connected to the control unit draws electrical energy from the electrical energy store of the utility vehicle even when the vehicle electrical distribution system is connected to the electrical energy source of the electronic braking system. The control unit can be configured, for example, in such a way that both via the energy supply connection and via the electrical energy store a voltage drop and/or energy dip at the respective other electrical energy source can be compensated for by the energy supply connection or the electrical energy store. In exemplary embodiments, the energy supply connection comprises an electrical coupling system of the utility vehicle trailer to a towing vehicle.

While, in exemplary embodiments, the energy source of the electronic braking system is an energy source of the towing vehicle such as, for example, an alternator or a chargeable battery, in exemplary embodiments the energy source of the electronic braking system can alternatively or additionally be a component of the utility vehicle trailer. The electronic braking system can be supplied energy, for example, from a 24V energy source of the towing vehicle, for which purpose a suitable electrical connection (energy supply connection) can be provided between the towing vehicle and the utility vehicle trailer. Therefore, in exemplary embodiments, a reference to ground for this energy source corresponds to the first ground potential, wherein a conversion of this first ground potential to a ground potential of the utility vehicle trailer (second ground potential) takes place in exemplary embodiments via a DC-isolated DC-DC converter (an example of a first voltage transformer device).

In exemplary embodiments, the energy source of the utility vehicle trailer can comprise an electric generator of the electronic braking system, via which energy is produced during driving and/or during braking. This energy can be used for charging the electrical energy store and/or for operating the at least one consumer connected to the control unit.

The control unit can enable and/or monitor further functions of the utility vehicle trailer. Thus, in one exemplary embodiment, the at least one consumer comprises a telematics system of the utility vehicle trailer, wherein the control unit, in addition to the energy supply to the telematics system, also monitors a flow of information (for example signal transmission from sensors connected to the telematics system) from the telematics system. In one exemplary embodiment, the control unit comprises a body control unit (BCU). Alternatively or additionally, in one exemplary embodiment the at least one consumer comprises an electronic locking system of the utility vehicle trailer.

The control unit comprises a first voltage transformer device, wherein a voltage transformer device can in particular serve the purpose of converting a voltage provided by an electrical energy source into a voltage which is necessary and/or suitable for operating a respective consumer. In particular, the first voltage transformer device in one exemplary embodiment serves the purpose of converting a voltage which is present at the energy supply connection into a voltage which is necessary and/or suitable for operating the at least one consumer. In one exemplary embodiment, the first voltage transformer device is used for DC-isolating the ground potential connected to the energy supply connection from a ground potential connected to the electrical energy store.

In the first operating state of the control unit, electrical energy for operating the at least one consumer is provided via the energy supply connection. Via the energy supply connection, the vehicle electrical distribution system is connected, at least in the first operating state, to the electrical energy source of the electronic braking system of the utility vehicle trailer. In one exemplary embodiment, the electrical energy source is an energy source (for example an alternator and/or a chargeable battery) of the towing vehicle.

In this case, in exemplary embodiments more energy can be provided via the energy supply connection than the at least one consumer consumes, with the result that it is possible at the same time for the electrical energy store to be charged via the energy supply connection. In alternative embodiments, the consumer can require more electrical energy than is provided via the energy supply connection, with the result that additionally required electrical energy is provided via the electrical energy store.

An electrical energy source (for example the electrical energy source of the electronic braking system and/or the electrical energy store of the utility vehicle trailer) supplies a voltage (for example a DC voltage) and a current (for example a direct current) to a (directly or indirectly) connected consumer (for example the at least one consumer connected to the control unit). One example of such an electrical energy source is a voltage source which, in the ideal case, provides a voltage which is independent of the connected consumer and a current which is dependent on the connected consumer. The electrical power provided at a specific time by the electrical energy source is a function of the voltage provided at this time by the electrical energy source and the current provided at this time by the electrical energy source and corresponds, if the provided voltage is a DC voltage and/or the provided current is a direct current, to the product of the provided voltage and the provided current. The electrical energy provided over a specific time period by the electrical energy source is a function of the electrical power provided in this time period by the electrical energy source and corresponds, if the provided electrical power is constant in this time period, to the product of the provided electrical power and the time span of this time period.

Correspondingly, the provision of an electrical energy for operating a consumer (for example for operating the at least one consumer connected to the control unit) by an energy source (for example the electrical energy source of the electronic braking system and/or the electrical energy store of the utility vehicle trailer) should be understood to mean, for example, that the electrical energy source provides a voltage (for example a DC voltage) and a current (for example a direct current) for operating the consumer (for example for operating the at least one consumer connected to the control unit).

In the second operating state, electrical energy for operating the at least one consumer of the control unit is provided by the electrical energy store of the utility vehicle trailer.

In exemplary embodiments, the electrical energy store provides a DC voltage. In addition, in exemplary embodiments a DC voltage is provided to the electrical energy store for charging the electrical energy store. One example of such an electrical energy store is a chargeable battery such as a chargeable high-voltage battery (for example in the form of a metal hydride battery or a lithium-ion battery). The electrical energy store is part of the utility vehicle trailer. It goes without saying that the electrical energy store can additionally be part of a component of the utility vehicle trailer, for example a transport refrigeration machine.

The first voltage transformer device is configured to decouple the first ground potential, which is connected to the energy supply connection, from the second ground potential, which is connected to the electrical energy store of the utility vehicle trailer. In this case, ground potential should be understood to mean reference potential (for example zero potential) for the respectively present voltages. In other words, the first ground potential is a reference potential for a voltage present at the energy supply connection, and the second ground potential is a reference potential for a voltage of the electrical energy store of the utility vehicle trailer. In other words, the first voltage transformer device is configured to provide electrical isolation between the first ground potential and the second ground potential. On the one hand, such an electrical isolation is advantageous since it at least contributes to a protected, interference-free operation of consumers connected to the respective ground potentials (for example the electronic braking system, on the one hand, and the at least one consumer connected to the control unit, on the other hand).

On the other hand, in accordance with the present invention, decoupling the ground potentials of the electrical energy source of the electronic braking system of the utility vehicle trailer and the electrical energy store of the utility vehicle trailer in the control unit itself, for example in the BCU, is provided.

The control unit makes it possible in this way for consumers connected to the control unit, such as, for example, the telematics system and/or an electronic locking system of the utility vehicle trailer to be able to draw electrical energy both from the energy source of the electronic braking system and from the electrical energy store without a separate ground decoupling needing to be provided in one of these consumers itself. In contrast, central decoupling of the ground potentials is advantageously provided by the control unit, as a result of which, in particular, demands on complexity of consumers connected to the control unit are reduced.

In exemplary embodiments of the invention, the first voltage transformer device is a DC-DC converter circuit (a DC-DC converter) which is configured to DC-isolate the first ground potential, which is connected to the energy supply connection, from the second ground potential, which is connected to the electrical energy store of the utility vehicle trailer. In one exemplary embodiment, the first voltage transformer device is an isolated DC-DC converter circuit. In one exemplary embodiment, the first voltage transformer device comprises an isolating transformer (for example a flyback converter), a forward converter (for example a single-ended forward converter, in particular an active clamp forward converter), a push-pull forward converter, a flyback converter and/or a resonant converter (for example an LLC converter).

In exemplary embodiments of the invention, the first voltage transformer device is electrically connected to the energy supply connection and to the at least one consumer. In this case, the first voltage transformer device can be connected directly (only via electrical connections) or indirectly (via in each case one or more electronic components) to the energy supply connection and/or to the at least one consumer.

In exemplary embodiments, the first voltage transformer device is configured to conduct, in the first operating mode, electrical energy in a direction from the energy supply connection to the at least one consumer and in the process to convert an electrical voltage which is present at the energy supply connection into a lower electrical voltage. In this case, the voltage transformer device is configured in one exemplary embodiment to conduct the energy only in this direction. For example, the first voltage transformer device can be configured to convert an electrical voltage of 24V (volts) which is present at the energy supply connection, and therefore at the electronic braking system of the utility vehicle trailer, into a lower voltage of from 12V to 14V. The lower voltage is firstly suitable for operating consumers such as the telematics system and is secondly suitable for charging the energy store of the utility vehicle trailer, for example a chargeable battery.

In the first operating mode, in exemplary embodiments electrical energy for operating the at least one consumer is provided to the at least one consumer therefore via the first voltage transformer device.

In exemplary embodiments of the invention, the control system further comprises a second voltage transformer device, which is electrically connected to the electrical energy store of the utility vehicle trailer and the at least one consumer. In this case, the second voltage transformer device can be connected directly (only via electrical connections) or indirectly (via in each case one or more electronic components) to the electrical energy store of the utility vehicle trailer and/or to the at least one consumer. In this case, in exemplary embodiments electrical energy for operating the at least one consumer in the second operating mode is provided to the at least one consumer via the second voltage transformer device.

In exemplary embodiments, the second voltage transformer device is a bidirectional DC-DC converter circuit. This should be understood in such a way that electrical energy can be transmitted via the second voltage transformer device in both directions (i.e. via the second voltage transformer device in a direction from the electrical energy store of the utility vehicle trailer to the consumer and via the second voltage transformer device in a direction from the consumer to the electrical energy store of the utility vehicle trailer). Alternatively or additionally, this should be understood in such a way that voltages can be converted by the second voltage transformer device in both directions (i.e. via the second voltage transformer device in a direction from the electrical energy store of the utility vehicle trailer to the consumer and via the second voltage transformer device in a direction from the consumer to the electrical energy store of the utility vehicle trailer).

In exemplary embodiments of the invention, the second voltage transformer device comprises a consumer-end node for producing an electrical connection at least to the at least one consumer and an energy store-end node for producing an electrical connection to the electrical energy store, wherein the second voltage transformer device is configured for at least one of the following modes:

to conduct current from the energy store-end node to the consumer-end node, wherein a voltage at the energy store-end node corresponds to a voltage at the consumer-end node;

to draw current from the electrical energy store via the energy store-end node and to conduct it on via the consumer-end node, wherein a voltage at the consumer-end node is higher than a voltage at the energy store-end node;

to conduct current from the consumer-end node via the energy store-end node to the electrical energy store, wherein a voltage at the energy store-end node is lower than a voltage at the consumer-end node;

to feed current from the consumer-end node to the electrical energy store without reducing the voltage between the consumer-end node and the energy store-end node.

In this case, an electrical connection should be understood to mean a connection via which the electrical energy can be transmitted. One example of such an electrical connection is an electrical line which can have, for example, two electrical conductors in the case of DC voltage. The first and second nodes can correspondingly be, for example, in the form of terminals for such an electrical line (for example having two conductors).

Therefore, the regulation, in particular by the second voltage transformer device, can enable at least one or more of the described four different operating modes, wherein the second voltage transformer device can enable further operating modes which are not described here. With these four operating modes it is in particular possible for, in various scenarios, for example in the case of a voltage dip at the energy source of the electronic braking system during starting of, for example, a diesel engine of a towing vehicle, in the case of a deep discharge of the electrical storage unit, and/or in the case of a completely charged electrical storage unit, a voltage present at the consumer-end node to be stable. This advantageously contributes to the possibility of ensuring a stable and safe operation of consumers connected to the control unit.

In exemplary embodiments, the second voltage transformer device comprises a cascade controller, which comprises an internal controller which is configured to set a bidirectional setpoint current (a control range can go continuously, for example, from −15 A to +15 A without the need to switch over an operating state), and which comprises an external controller which is configured to set a setpoint voltage. Such a controller has proven to be advantageous for ensuring a stable voltage at the consumer-end node of the second voltage transformer device, and therefore for the control unit, for example in the described scenarios. It therefore becomes advantageously possible to support and stabilize the system of the control unit.

In exemplary embodiments of the invention, the electrical energy store of the utility vehicle trailer is a chargeable battery, in particular a metal hydride battery or a lithium-ion battery.

In exemplary embodiments of the invention, the utility vehicle trailer further comprises a transport refrigeration machine for cooling a cargo area of the utility vehicle trailer.

In one exemplary embodiment, the transport refrigeration machine comprises an electric motor, wherein electrical energy for operating the electric motor is provided by a chargeable battery (which can be provided in addition to the electrical energy store).

A transport refrigeration machine can generate, for example, cooled air which is blown into a cargo area of the utility vehicle trailer. For this purpose, the transport refrigeration machine can comprise, in exemplary embodiments, a cooling circuit having a compressor driven by the electric motor for compressing a coolant, a condenser, a throttle device and a heat exchanger. In the cooling circuit the coolant compressed by the compressor flows via the condenser and a throttle device, which is arranged behind the condenser in the direction of flow and can be in the form of a control valve, for example, to the heat exchanger. In the heat exchanger, the previously liquified coolant expands and in the process draws heat from an air flow conducted separately from the coolant through the heat exchanger so that the air of the air flow is cooled. The cooled air of this air flow is then blown into the cargo area of the utility vehicle trailer in order to cool it.

In exemplary embodiments, in the first operating state of the control unit and/or in a third operating state of the control unit, electrical energy for charging the chargeable battery is provided via the energy supply connection. This should be understood to mean that the control unit in exemplary embodiments is configured in such a way as to conduct (in the first operating state of the control unit) a flow of electrical energy from the energy supply connection in such a way that, firstly, the battery is charged while the at least one consumer connected to the control unit draws electrical energy via the energy supply connection. Secondly, the control unit is, in exemplary embodiments, alternatively or additionally configured in such a way as to conduct (in the third operating state of the control unit) a flow of electrical energy from the energy supply connection in such a way that the battery is charged although no consumer connected to the control unit is drawing electrical energy via the energy supply connection.

In exemplary embodiments, the utility vehicle trailer comprises a generator, which is driven by an internal combustion engine in order to generate electrical energy, wherein the generator is connected to the electrical energy store of the utility vehicle trailer (for example via one or more suitable voltage transformers) in order to charge the electrical energy store with generated electrical energy. Alternatively or additionally, the utility vehicle trailer comprises at least one solar panel which is electrically connected to the electrical energy store of the utility vehicle trailer for charging the electrical energy store of the utility vehicle trailer.

In exemplary embodiments, the electrical energy source of the electronic braking system is an electrical energy source of a towing vehicle to which the vehicle electrical distribution system is electrically connected at least in the first operating state, via the energy supply connection. For example, the energy source of the towing vehicle can be an alternator of the towing vehicle which generates electrical energy when the towing vehicle is travelling and towing the utility vehicle trailer.

In particular in this state, the utility vehicle trailer is firstly mechanically coupled to the towing vehicle. Secondly, in exemplary embodiments, in this state the vehicle electrical distribution system of the utility vehicle trailer is electrically connected to the alternator via the energy supply connection, with the result that the chargeable battery of the utility vehicle trailer (of the electrical energy store) can be charged via the electrical energy generated during the journey.

Alternatively or additionally, the energy source of the towing vehicle can be a chargeable battery of the towing vehicle.

In accordance with the present invention, a system is furthermore provided, comprising:
the utility vehicle trailer, and
a towing vehicle.

In exemplary embodiments, the towing vehicle comprises a heavy goods vehicle (HGV) or a tractor.

Further advantageous exemplary configurations of the invention can be gleaned from the following detailed description of some exemplary embodiments of the present invention, in particular in conjunction with the figures. The figures attached to the Application should be used merely for clarification purposes, however, and not for determining the scope of protection of the invention. The attached drawings are not necessarily true to scale and should merely reflect, by way of example, the general concept of the present invention. In particular, features which are included in the figures should in no way be considered as being an essential part of the present invention.

DETAILED DESCRIPTION

Figure 1:
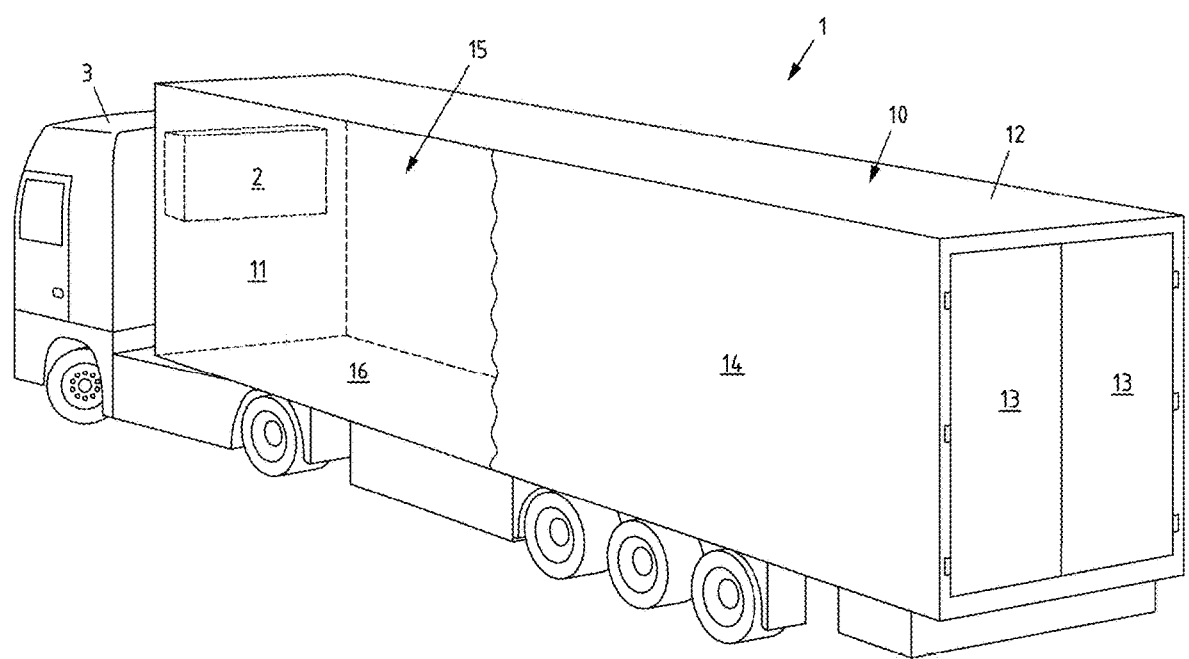
FIG. 1 is a schematic illustration of an exemplary embodiment of a utility vehicle trailer in accordance with the invention.

FIG. 1 is a schematic illustration of an exemplary embodiment of a utility vehicle trailer 1 in accordance with the invention.

The utility vehicle trailer 1 is a semitrailer 1 having a box body 10. The box body 10 comprises a solid end wall 11, a solid roof 12, a rear wall formed by folding doors 13 and solid side walls 14. The box body 10 in this case surrounds a cargo area 15 for accommodating goods to be transported. The front side wall 14 is illustrated partially sectioned in FIG. 1 in order to allow a view into the cargo area 15, onto the loading floor 16 and onto a transport refrigeration machine 2 (illustrated merely schematically) which is mounted on the end wall 11.

The transport refrigeration machine 2 serves to cool the cargo area 15 so that temperature-sensitive goods can be transported in the cargo area 15. For this purpose, the transport refrigeration machine 2 can cool air, for example, and then blow it into the cargo area 15.

In addition, the semitrailer can have an electric generator 17 (not illustrated) in the form of an axle-driven generator which is driven by the rotation of an axle of the semitrailer 1 and correspondingly generates and/or can generate electrical energy in the form of an AC voltage (for example a three-phase AC voltage having a voltage of the order of from 300V to 540 V (for example 400 V) (rms value of the line-to-line voltages)) when the semitrailer 1 is travelling.

The semitrailer 1 is towed by a towing vehicle 3, in the exemplary embodiment illustrated by a tractor 3.

Figure 2:
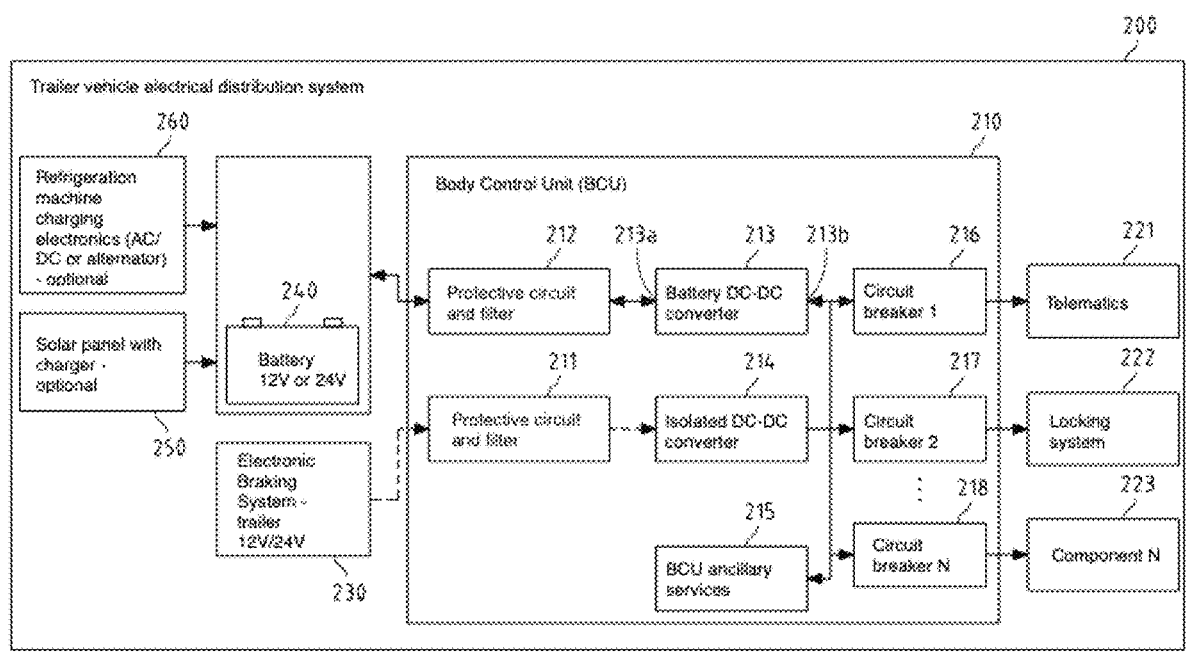
FIG. 2 is a schematic illustration of an exemplary embodiment of a vehicle electrical distribution system in accordance with the invention.

FIG. 2 is a schematic illustration of an exemplary embodiment of a vehicle electrical distribution system 200 of the utility vehicle trailer 1.

As is illustrated schematically, the vehicle electrical distribution system comprises an electrical energy store 240 in the form of a chargeable battery 240 and an electronic braking system 230, wherein an energy source (not illustrated) of the electronic braking system 230 and the chargeable battery 240 are provided as two energy sources of the vehicle electrical distribution system 200. As described at the outset, the energy source of the electronic braking system 230 can comprise an energy source of the towing vehicle 3, for example an alternator and/or a chargeable battery of the towing vehicle 3 and/or an energy source of the utility vehicle trailer 1, such as, for example, a generator (not illustrated) of the electronic braking system 230. In particular in the case where the energy source of the electronic braking system 230 comprises an energy source of the towing vehicle 3, the energy supply connection can comprise an electrical coupling system (not illustrated) of the utility vehicle trailer 1 to the towing vehicle 3.

As mentioned at the outset and illustrated in FIG. 2, the chargeable battery 240 in exemplary embodiments can be a battery of the transport refrigeration machine 2 from FIG. 1. In order to charge the battery 240, in one exemplary embodiment, a generator 260 such as, for example, an alternator 260 is provided which is driven by an internal combustion engine (not illustrated) in order to generate electrical energy. The generator is connected to the battery 240 in order to charge this electrical store with generated electrical energy.

As further illustrated in FIG. 2, the utility vehicle trailer 1 can comprise at least one solar panel 250 which is electrically connected to the battery 240 for charging the battery 240.

The vehicle electrical distribution system 200 furthermore has a control device 210, which corresponds in the embodiment shown in FIG. 2 to a body control unit (BCU) of the utility vehicle trailer 1. It goes without saying that the control unit 210 can comprise further electronic components, in addition to the electronic components illustrated and described below.

As can be seen from FIG. 2, the control unit 210 comprises a first voltage transformer device 214, which comprises, in the embodiment illustrated, an isolated DC-DC converter circuit 214 (for example an active clamp forward converter). This is electrically connected on one side to the electronic braking system 230 and electrically connected on the other side to the at least one consumer, which, in the embodiment illustrated, comprises a telematics system 221, an electronic locking system 222 and possibly one or more electronic components 223. Thus, in the first operating state of the control unit 210, electrical energy for operating, for example, the telematics system 221 and/or the electronic locking system 222 of the utility vehicle trailer 1 can be provided via an energy supply connection (not illustrated), via which the vehicle electrical distribution system 200 is connected, at least in the first operating state, to the electrical energy source (not illustrated) of the electronic braking system 230 of the utility vehicle trailer 1.

The isolated DC-DC converter circuit 214 is configured in such a way that it decouples a first ground potential, which is connected to the energy supply connection and therefore to the electronic braking system 230, from a second ground potential, which is connected to the chargeable battery 240 (the electrical energy store) of the utility vehicle trailer 1. While in this case, in one exemplary embodiment, complete DC isolation is provided, a DC-DC converter circuit is also conceivable, however, which does not provide perfect electrical isolation. The isolated DC-DC converter circuit 214 thus provides DC isolation between the electronic braking system 230 and the chargeable battery 240, which contributes in particular to safe and stable operation of the electronic braking system 230. The isolated DC-DC converter circuit 214 is configured in one exemplary embodiment in such a way that it can conduct electrical energy only in one direction from the electronic braking system 230 (and/or from the energy supply connection (not illustrated)) to the consumers 221, 222, 223. In particular, the isolated DC-DC converter circuit 214 is configured in such a way that it can convert a voltage of, for example, 24V present at the electronic braking system 230 into a voltage of from 12V to 14V, which is suitable firstly for operating the consumers 221, 222, 223 but secondly also for charging the battery 240. The voltage which is provided by the isolated DC-DC converter circuit 214 is furthermore also suitable for operating the control unit 210 itself in order to provide the ancillary services 215 (illustrated schematically) in respect of electrical energy.

With this possibility of electrical isolation by virtue of the isolated DC-DC converter circuit 214, the control unit 210 makes it possible for consumers connected to the control unit 210, such as, for example, the telematics system 221 and/or the electrical locking system 222, to be able to draw electrical energy both from the energy source of the electronic braking system 230 and from the chargeable battery 240 without the need for the provision of a separate potential decoupling or ground decoupling in the respective consumer itself. A central ground decoupling provided by the isolated DC-DC converter circuit 214 therefore makes consumers having a markedly reduced complexity possible.

As can further be seen from FIG. 2, the control unit 210 comprises a second voltage transformer device 213, which is electrically connected to the chargeable battery 240 of the utility vehicle trailer 1 via an energy store-end node 213a and is connected to the consumers 221, 222, 223 via a consumer-end node 213b. In this case, electrical energy for operating the consumers 221, 222, 223 is provided in the second operating mode of the control unit 210 to the consumers 221, 222, 223 via the second voltage transformer device 213. In the second operating mode of the control unit 210, electrical energy for operating the consumers 221, 222, 223 is provided by the chargeable battery 240 of the utility vehicle trailer 1.

The second voltage transformer device 213 is, in the exemplary embodiment illustrated, a bidirectional DC-DC converter circuit. In other words, the second voltage transformer device 213 is configured to conduct electrical energy both in a direction from the chargeable battery 240 to the consumers 221, 222, 223 and in the reverse direction towards the chargeable battery 240. It is thus possible, for example, to conduct electrical current from the energy source of the electronic braking system 230 via the first voltage transformer device 214 and via the second voltage transformer device 213 and thereby to charge the chargeable battery 240. Secondly, it is thus possible to conduct electrical current from the chargeable battery 240 via the second voltage transformer device 213 in the direction of the consumers 221, 222, 223 and thereby to operate the consumers 221, 222, 223.

In this way it is possible for the chargeable battery 240, which, in the embodiment illustrated, is a battery for operating a transport refrigeration machine, to be capable of being continuously recharged, for example when the utility vehicle trailer 1 is connected to the towing vehicle 3 and when the energy source of the electronic braking system 230 is an energy source of the towing vehicle 3. In this way, a very high degree of availability of a transport refrigeration machine is provided to a user, which favors dry freight transportation in a utility vehicle trailer with a cooling function. Continuous charging of the battery 240 which is thus possible is furthermore advantageous since regular charging of the battery with correspondingly reduced discharge cycles of the battery reduces loading on the battery. This can contribute in particular to an extension of the life and an increase in the reliability of the battery 240.

In one exemplary embodiment, a voltage present at the consumer-end node 213b during operation of the control unit 210 is equal to or greater than a voltage present at the energy store-end node 213a, which corresponds in the embodiment illustrated to the voltage of the battery 240 of the transport refrigeration machine. In one exemplary embodiment, the second voltage transformer device 213 implements a push-pull topology.

In one exemplary embodiment, the control unit 210 comprises a first protective circuit 211 and/or a first electronic filter 211, via which the first voltage transformer device 214 is connected to the energy supply connection and/or the electronic braking system 230. In one exemplary embodiment, the control unit 210 comprises a second protective circuit 212 and/or a second electronic filter 212, via which the second voltage transformer device 213 is connected to the electrical energy store 240, in particular the chargeable battery 240, of the utility vehicle trailer 1.

In this way, it is advantageously possible for the first voltage transformer device 214 and/or the second voltage transformer device 213 to be protected from potentially damaging high voltages which can occur, for example, when electronic components involved are disconnected.

In one exemplary embodiment, the at least one consumer is connected to the control unit, in particular directly (possible only via corresponding electrical connections), via a corresponding at least one circuit breaker. In one exemplary embodiment, the at least one circuit breaker is connected to the first voltage transformer device and/or the second voltage transformer device directly (possible only via corresponding electrical connections). As is shown in FIG. 2, the consumers 221, 222, 223 are connected to the control unit 210 via corresponding circuit breakers 216, 217, 218. These circuit breakers 216, 217, 218 can firstly enable targeted driving of individual consumers and secondly possibly also high powers can be switched using these breakers.

Figure 3:
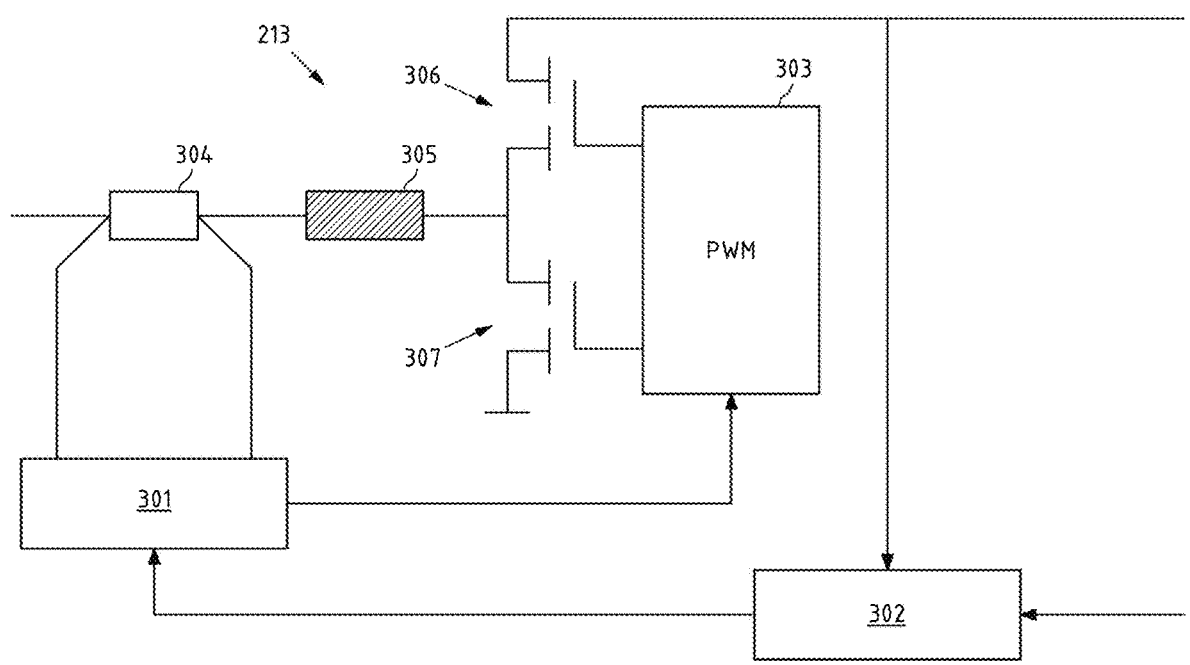
FIG. 3 is a schematic illustration of an exemplary embodiment of a second voltage transformer device.

FIG. 3 shows an exemplary configuration of a second voltage transformer device 213. As illustrated in FIG. 3, the second voltage transformer device 213 comprises a current controller 301, a voltage controller 302, a pulse-width-modulation unit 303, a first transistor 306 and a second transistor 307.

In one exemplary embodiment, the second voltage transformer device 213 comprises a cascade controller. In this case the current controller 301 is configured as an internal controller to set a setpoint current and the voltage controller 302 is configured as an external controller to set a voltage which is present in particular at the consumers 221, 222, 223.

As described at the outset, the second voltage transformer device 213 enables operation in one of at least four operating modes. The voltage transformer device 213 is configured in a first operating mode to conduct current from the energy store-end node 213a to the consumer-end node 213b, wherein a voltage at the energy-store-end node 213a corresponds to a voltage at the consumer-end node 213b.

In a second operating mode, the second voltage transformer device 213 is configured to draw current from the electrical energy store 240, in the embodiment illustrated in FIG. 2 the chargeable battery 240, via the energy store-end node 213a and to conduct it on via the consumer-end node 213b, wherein a voltage at the consumer-end node 213b is higher than a voltage at the energy store-end node 213a.

In a third operating mode, the voltage transformer device 213 is configured to conduct current from the consumer-end node 213b via the energy store-end node 213a to the electrical energy store 240, in the embodiment illustrated in FIG. 2 the chargeable battery 240, wherein a voltage at the energy store-end node 213a is lower than a voltage at the consumer-end node 213b.

As a result, it advantageously becomes possible for the control unit 210 to be able to ensure, in various situations, a stable and safe voltage at the consumer-end node 213b, for example in the case of a voltage dip at the energy source of the electronic braking system, during starting of, for example, a diesel engine of a towing vehicle, in the case of a deep discharge of the electrical storage unit and/or in the case of a completely charged electrical storage unit. This contributes advantageously to the possibility of ensuring stable and safe operation of the consumers 221, 222, 223 connected to the control unit. In particular, this makes it possible to configure the second voltage transformer device 213 in such a way that these four operating modes can be implemented continuously without any switchover operations.

The exemplary embodiments of the present invention which are described in this specification should also be understood as being disclosed in all combinations with one another. In particular, the description of a feature included in an embodiment, if not explicitly explained to the contrary, should also not be understood here to mean that the feature is imperative or essential for the function of the exemplary embodiment. The order of the method steps described in this specification is not compulsory; alternative orders of the method steps are conceivable, if not stated to the contrary. The method steps can be implemented in a variety of ways, and thus an implementation using software (programming statements), hardware or a combination of the two for implementing the method steps is conceivable.

Terms used in the patent claims such as "comprise", "have", "include", "contain" or the like do not exclude further elements or steps. The wording "at least partially" includes both the case of "partially" and the case of "completely". The wording "and/or" should be understood to the extent that both the alternative and the combination are intended to be disclosed, i.e. "A and/or B" means "(A) or (B) or (A and B)". A plurality of units, persons or the like means in the context of this specification more than one unit, person or the like. The use of the indefinite article does not exclude a plurality. A single device can perform the functions of a plurality of units or devices mentioned in the patent claims. Reference symbols cited in the patent claims should not be considered as restrictions to the means and steps.

The invention claimed is:

1. A utility vehicle trailer connectable to a towing vehicle, the utility vehicle trailer having a vehicle electrical distribution system, wherein the vehicle electrical distribution system comprises:
   an electronic braking system of the utility vehicle trailer, connectable to an energy source of the towing vehicle via an energy supply connection connected to a first ground potential,
   an electrical energy store of the utility vehicle trailer connected to a second ground potential,
   at least one consumer of the utility vehicle trailer, and
   a control unit having a first voltage transformer device connected to the at least one consumer,
   wherein electrical energy for operating the at least one consumer in a first operating state of the control unit is provided from the energy source of the towing vehicle via the energy supply connection to the electronic braking system, and from the electronic braking system via the first voltage transformer device to the at least one consumer,
   wherein electrical energy for operating the at least one consumer in a second operating state of the control unit is provided by the electrical energy store of the utility vehicle trailer, and
   wherein the first voltage transformer device is configured: to decouple the first ground potential from the second ground potential.

2. The utility vehicle trailer having the vehicle electrical distribution system of claim 1, wherein the first voltage transformer device is a DC-DC converter circuit which is configured to DC-isolate the first ground potential from the second ground potential.

3. The utility vehicle trailer having the vehicle electrical distribution system of claim 1, wherein the first voltage transformer device is electrically connected to the energy supply connection and to the at least one consumer and is configured to conduct, in the first operating mode, electrical energy in a direction from the energy supply connection to the at least one consumer and in the process to convert an electrical voltage which is present at the energy supply connection into a lower electrical voltage.

4. The utility vehicle trailer having the vehicle electrical distribution system of claim 1, wherein the control unit further comprises a second voltage transformer device, which is electrically connected to the electrical energy store of the utility vehicle trailer and the at least one consumer, wherein electrical energy for operating the at least one consumer in the second operating mode is provided to the at least one consumer via the second voltage transformer device.

5. The utility vehicle trailer having the vehicle electrical distribution system of claim 4, wherein the second voltage transformer device is a bidirectional DC-DC converter circuit, which is configured to conduct electrical energy both in a direction from the electrical energy store of the utility vehicle trailer to the at least one consumer and in a direction to the electrical energy store of the utility vehicle trailer.

6. The utility vehicle trailer having the vehicle electrical distribution system of claim 4, wherein the second voltage transformer device comprises a consumer-end node for producing an electrical connection at least to the at least one consumer and an energy store-end node for producing an electrical connection to the electrical energy store, wherein the second voltage transformer device at least for one of the following modes:
   to conduct current from the energy store-end node to the consumer-end node, wherein a voltage at the energy store-end node corresponds to a voltage at the consumer-end node;
   to draw current from the electrical energy store via the energy store-end node and to conduct it on via the consumer-end node, wherein a voltage at the consumer-end node is higher than a voltage at the energy store-end node;

to conduct current from the consumer-end node via the energy store-end node to the electrical energy store, wherein a voltage at the energy store-end node is lower than a voltage at the consumer-end node;

to feed current from the consumer-end node to the electrical energy store without reducing the voltage between the consumer-end node and the energy store-end node.

7. The utility vehicle trailer having the vehicle electrical distribution system of claim 4, wherein the second voltage transformer device comprises a cascade controller, which comprises an internal controller which is configured to set a setpoint current, and which comprises an external controller which is configured to set a setpoint voltage.

8. The utility vehicle trailer having the vehicle electrical distribution system of claim 1, wherein the electrical energy store of the utility vehicle trailer is a chargeable battery.

9. The utility vehicle trailer having the vehicle electrical distribution system of claim 8, wherein, in the first operating state of the control unit and/or in a third operating state of the control unit, electrical energy for charging the chargeable battery is provided via the energy supply connection.

10. The utility vehicle trailer having the vehicle electrical distribution system of claim 1, further comprising a transport refrigeration machine for cooling a cargo area of the utility vehicle trailer.

11. The utility vehicle trailer having the vehicle electrical distribution system of claim 1, wherein the electrical energy source of the electronic braking system is the electrical energy source of the towing vehicle to which the vehicle electrical distribution system is electrically connected at least in the first operating state via the energy supply connection.

12. The utility vehicle trailer having the vehicle electrical distribution system of claim 1, wherein the at least one consumer comprises a telematics system of the utility vehicle trailer and/or an electronic locking system of the utility vehicle trailer.

13. The utility vehicle trailer having the vehicle electrical distribution system of claim 1, wherein the utility vehicle trailer is a semitrailer.

14. A system comprising the utility vehicle trailer of claim 1, and the towing vehicle.

15. The utility vehicle trailer having a vehicle electrical distribution system as claimed in claim 1, wherein the energy supply connection comprises an electrical coupling system of the utility vehicle trailer to the towing vehicle.

* * * * *